United States Patent
Neumann

(10) Patent No.: US 11,481,888 B2
(45) Date of Patent: Oct. 25, 2022

(54) METHOD FOR INSPECTING THE COATING OF AN ELECTRONIC COMPONENT

(71) Applicant: HELLA GmbH & Co. KGaA, Lippstadt (DE)

(72) Inventor: Arndt Neumann, Stuhr (DE)

(73) Assignee: HELLA GMBH & CO. KGAA, Lippstadt (DE)

(*) Notice: Subject to any disclaimer, the term of this patent is extended or adjusted under 35 U.S.C. 154(b) by 82 days.

(21) Appl. No.: 16/870,408

(22) Filed: May 8, 2020

(65) Prior Publication Data
US 2020/0357113 A1    Nov. 12, 2020

(30) Foreign Application Priority Data
May 10, 2019   (DE) .................. 10 2019 112 238.4

(51) Int. Cl.
*G06T 7/00*   (2017.01)
*G01N 21/84*  (2006.01)

(52) U.S. Cl.
CPC ....... *G06T 7/0004* (2013.01); *G01N 21/8422* (2013.01); *G01N 2021/8427* (2013.01)

(58) Field of Classification Search
CPC ............ G01B 11/0616; G01B 11/0675; G01B 15/02; G01B 21/085; G01N 2021/3531; G01N 21/45; G01N 25/72; G01N 2021/8427; G01N 21/8422; G06T 7/001; G06T 2207/10016; G06T 2207/10048; G06T 7/0004
USPC ..... 356/237.1–237.3, 239.7–239.8; 382/141, 382/348
See application file for complete search history.

(56) References Cited

U.S. PATENT DOCUMENTS

| | | | | |
|---|---|---|---|---|
| 4,920,319 A | * | 4/1990 | Viertl ................. | G01B 7/06 324/451 |
| 5,208,645 A | * | 5/1993 | Inoue ................ | G01B 11/0616 356/73.1 |
| 5,212,540 A | * | 5/1993 | Miller ............... | G01B 11/06 356/631 |

(Continued)

FOREIGN PATENT DOCUMENTS

| CN | 108413882 A | 8/2018 |
|---|---|---|
| DE | 4017440 A1 | 12/1991 |

OTHER PUBLICATIONS

Search Report of DE Application No. 102019112238.4, dated Jan. 28, 2020, 7 pages.

(Continued)

*Primary Examiner* — Isiaka O Akanbi
(74) *Attorney, Agent, or Firm* — Muncy, Geissler, Olds & Lowe, P.C.

(57) ABSTRACT

In an method for inspecting the coating of an electronic component, wherein the electronic component includes at least one electrical resistance element and wherein the layer thickness of at least one coating is determined thermographically, it is provided as essential to the invention that the electrical resistance element is contacted electrically, an electrical voltage is applied to the resistance element, the temperature of the electronic component in the area of the resistance element is captured as a function of time, and a conclusion is drawn about the layer thickness of the coating of the electronic component in the area of the resistance element based on the temperature variation over time.

14 Claims, 2 Drawing Sheets

(56) References Cited

U.S. PATENT DOCUMENTS

Figure 1:
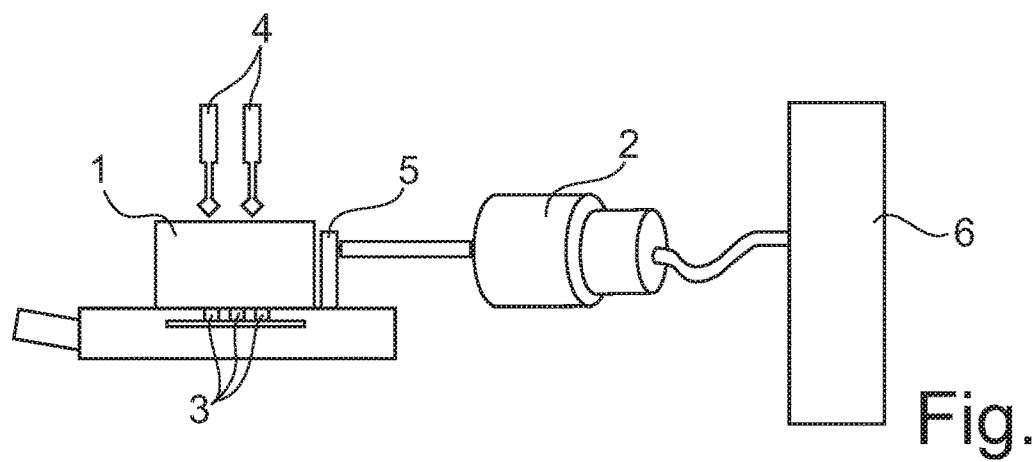

| | | | | |
|---|---|---|---|---|
| 5,272,434 A * | 12/1993 | Meyrueix | ............ | G01R 31/308 |
| | | | | 324/73.1 |
| 5,387,309 A * | 2/1995 | Bobel | ................ | G01B 11/0675 |
| | | | | 117/85 |
| 5,394,098 A * | 2/1995 | Meyrueix | ............ | G01R 31/308 |
| | | | | 324/754.23 |
| 5,396,080 A * | 3/1995 | Hannotiau | ......... | G01B 11/0616 |
| | | | | 250/559.28 |
| 5,590,560 A * | 1/1997 | Joos | ....................... | G01N 11/00 |
| | | | | 356/73 |
| 5,619,330 A * | 4/1997 | Ehemann, Jr. | ..... | G01B 11/0633 |
| | | | | 250/559.28 |
| 2010/0268205 A1* | 10/2010 | Manwaring | ........ | A61B 18/1492 |
| | | | | 606/29 |
| 2012/0269978 A1* | 10/2012 | Hintze-Bruning | ..... | C09D 5/028 |
| | | | | 427/407.1 |
| 2018/0005905 A1* | 1/2018 | Guaino | .................. | H01L 22/14 |

OTHER PUBLICATIONS

Winiarski et al., "Analysis of steady-state and transient thermal properties of cermet, polymer and LTCC thick-film resistors," Circuit World, vol. 40, No. 1, 2014, pp. 17-22, 6 pages.

Nowak et al., "Temperature fields and reliability on thick-film components under pulse mode operation," MIXDES 2010, 6 pages.

\* cited by examiner

METHOD FOR INSPECTING THE COATING OF AN ELECTRONIC COMPONENT

The invention relates to a method for inspecting the coating of an electronic component, wherein the electronic component includes at least one electrical resistance element and wherein the layer thickness of at least one coating is determined thermographically.

Quality control of coatings is very important, particularly in serial production of electronic components. Coatings may be used for example to protect an electronic component from external environmental influences such as atmospheric humidity or the like. A coating that is incomplete or too thin may cause the electronic component to be imperfectly sealed, with the result that its proper function can no longer be guaranteed.

Automatic optical inspection (AOI) methods are known for example, in which the components produced are examined using image processing methods. Particularly in the domain of Quality Control of coatings, optical inspection methods can be prone to errors and time-consuming, because it is very difficult to detect faulty coatings optically. It is also possible to use a heat flow thermograph, in which the coating area to be examined is excited thermally by means of an energy source, for example by means of an Infrared flash, and the temperature variation after the thermal excitation is examined. In particular, an infrared flash can be used to thermally excite the surface of a coating. The heat which is introduced into the surface spreads in the coating material over the course of time, and conclusions may be drawn about the layer thickness from the progression of the temperature distribution over time. In this context, material faults may be observed as temperature differences.

When examining the layer thickness of a coating of an electronic component, it is most often necessary to determine the thickness of the coating over a certain component, over a resistance element for example. The use of heat flow thermography to determine layer thickness over a certain electrical element of the electronic component presents difficulties because during heat flow thermography an entire area on the surface of the coating is excited thermally and it is difficult to associate a detected temperature trend to an electrical element which is arranged below the coating.

The object underlying the invention is to suggest a method for inspecting the coating of an electronic component with which it is possible to determine the layer thickness above an electrical element located under the coating with little time expenditure.

The solution to this object is realised with a method having the features of Claim 1. Refinements and advantageous variations are described in the subordinate claims.

In a method for inspecting the coating of an electronic component, wherein the electronic component has at least one electrical resistance element and wherein the layer thickness of at least one coating is determined thermographically, it is provided as essential to the invention that the electrical resistance element is contacted electrically, that an electrical voltage is applied to the resistance element, that the temperature of the electronic component as a function of time is captured in the area of the resistance element, and that a conclusion is drawn about the layer thickness of the coating of the electronic component in the area of the resistance element from the variation in temperature over time. In a method for inspecting the coating of an electronic component, a component with an electrical resistance element is examined. Particularly in such a case, it should be guaranteed that the coating is sufficient, that is to say the layer thickness of the coating over the electrical resistance element is sufficient, so that the electrical resistance element is protected against environmental influences. A thermographic process in which the electronic component is excited thermally and the progression over time of the thermal excitation is captured is used to determine the layer thickness over the electrical resistance element. In order to excite the electronic component thermally, the component is contacted electrically. In particular, the electronic component may have contact regions, for example a port such as a plug connection, with which the electronic component may also be contacted during subsequent operation, i.e. during use. The contact regions serve as a simple way to create an electrical contact of the electronic component, and particularly the resistance element of the electronic component. A voltage is applied to the resistance element via the electrical contact. The application of a voltage has the effect of heating up the resistance element. The temperature of the electronic component in the area of the resistance element is determined from the outside, in particular contactlessly, by a temperature sensing device, for example by a pyrometer or a thermal imaging camera or similar. In this process, particularly the variation in the temperature of the outer coating of the electronic component in the area of the resistance element, that is to say of the coating covering the resistance element is examined. Thus for example the initial temperature when the electrical voltage is applied, that is to say the normal temperature of the coating, and the temperature after a time interval may be determined. A conclusion may be drawn about the layer thickness of the coating on the basis of the variation in temperature, particularly the rise in temperature over time. In particular, for example, the temperature of the outer coating in the area of the resistance element may rise significantly more quickly if the coating thickness is thin than in the case of an adequately coated resistance element. Limit values may be defined for the progression of the temperature over time after the electrical voltage is applied, above which values the electronic component is to be considered in order, and below which the electronic component is to be considered defective. The use of the resistance element as energy source for a thermographic determination of layer thickness enables a precise local resolution of the resistance element and a precise determination of the layer thickness of the coating disposed over the resistance element. The layer thickness determination may be evaluated with an evaluation unit, for example, and output to a general process controller which controls the manufacturing process of the electronic component.

In a further development of the method, the temperature variation is captured by means of at least one pyrometer.

A pyrometer is a radiation thermometer with which temperatures can be recorded contactlessly. Accordingly, after the voltage has been applied, the temperature variation on the outside of the electronic component, particularly the temperature of the coating over the electrical resistance element may be captured contactlessly and with a high degree of temporal resolution.

In a further development of the method, the temperature variation is captured by means of at least one thermal imaging camera. With a thermal imaging camera, the temperature may be captured contactlessly and with a high degree of local and temporal resolution. Heating up the resistance element enables the position of the resistance element underneath the coating to be captured very effectively on the basis of the thermal image. In particular, temperature measurements may be carried out in quick succession on a plurality of components of identical construction, for example in a mass production process in a factory.

In a further development of the method, the temperature variation over time is captured in the form of a rise in temperature over a defined measurement time interval, and a conclusion is drawn regarding the layer thickness of the coating on the basis of the rise in temperature. When a measurement voltage is applied to a resistance element, heat is generated and the heat spreads in the coating material which has been placed over the resistance element. The higher the temperature on the coating surface rises in a specified measurement time interval after the measurement voltage is applied, the thinner the layer thickness of the coating is. In order to determine the layer thickness, a predefined measurement voltage, for example a measurement voltage from 10 V-30 V, is applied to the resistance element and the rise in the temperature of the outer coating of the electronic component in the area of the resistance element within a measurement time interval is determined. A conclusion is drawn about the layer thickness on the basis of the rise in temperature within the measurement time interval. For example, a threshold value may be defined for the temperature rise which classifies a layer thickness as in order or defective.

In a further development of the method, the measurement time interval has a length of at least 0.5 second and not more than 5 seconds, in particular 1 second. A measurement time interval is defined to enable a comparison of the rise in temperature on the outer coating of a resistance element with a threshold value. In order to enable a measurement of multiple components in rapid succession, the measurement time interval selected is short. The measurement time interval is preferably one second. In order to determine the rise in temperature, the temperature at the beginning of the measurement time interval, that is to say the normal temperature of the coating over the resistance element without applied voltage is determined, and the temperature of the coating over the resistance element is determined after one second after the measurement voltage is applied. A difference is derived from the temperature start value and end value, with the aid of which the rise in temperature within the measurement time interval is defined.

In a further development of the method, a measurement time interval is started with the application of the electrical voltage to the resistance element. A first measured value of the temperature of the coating of the electronic component in the area of the resistance element is recorded at the start of the measurement time interval when the electrical voltage is applied, i.e. at normal temperature of the resistance element. A second measured value of the temperature is determined at the end of the measurement time interval, after one second, for example. The rise in temperature within the measurement time interval may be determined from the start temperature value and the end temperature value, thereby enabling a conclusion to be drawn regarding the layer thickness of the coating. In the same way, multiple measured temperature values may be captured constantly, that is to say continuously, wherein certain measured values may be selected from the multiplicity of measured values for determining the rise in temperature.

In a further development of the method, the electronic component is a sensor device, and the resistance element is a resistance thermometer. The electronic component may be a sensor device, particularly a temperature measuring device. The resistance element may be a resistance thermometer, which may be used to determine temperature. Thus, the resistance thermometer is also suitable for heating by the application of a voltage, so that the coating may be inspected using the resistance element.

In a further development of the method, the layer thickness is determined using a correlation between temperature variation and layer thickness which has been defined in advance and stored in an evaluation unit. In order to determine the layer thickness of the coating from the temperature variation after thermal excitation, it is necessary to define a correlation, particularly a correlation between the temperature variation and the layer thickness that can be expressed in a formula. This correlation is defined in advance and stored for example in an evaluation unit, for example in a control device, so that the formular correlation is available for use in the evaluation.

In a further development of the method, a formula-expressed correlation between the rise in temperature in the measurement time interval and the layer thickness is defined on the basis of a selection of electronic components with known layer thicknesses. The layer thickness of a coating is determined on the basis of the rise in temperature of the coating above a resistance element within a measurement time interval following application of a voltage. For this purpose, a formula-based correlation must be established between the layer thickness and rise in temperature during in the measurement time interval. The formula-based correlation is defined in advance based on a selection of electronic components. The selected electronic components preferably have different coating layer thicknesses above the resistance element. These layer thicknesses may be calculated precisely using x-ray methods. A measurement voltage, which is also used in subsequent serial tests, is applied to the electronic components with known layer thicknesses, particularly to the resistance elements thereof. The normal temperature, for example the temperature before the voltage is applied, and the temperature after a predetermined measurement time interval are captured and a rise in temperature of the coating in the area of the resistance element is determined. Thus, the temperature rises that are to be expected for various electronic components with various layer thicknesses are known. Accordingly, a correlation expressed as a formula may be calculated from the measured values for the various electronic components, and with this formula when the measurement time interval and the measurement voltage are known it is possible to calculate the layer thickness associated with a captured rise in temperature.

In a further development of the method, the layer thickness of the selection of electronic components is determined using x-ray technology. To determine the formula-expressed correlation between the rise in temperature in a measurement time interval and the layer thickness, a precise determination of the layer thicknesses in a selection of electronic components must be made in advance. For this purpose, the layer thicknesses of the coating above the resistance element are determined using x-ray inspection technology. In this process, portions of the electronic component are irradiated with x-rays, and the layer thickness is determined in the x-ray image.

In a further development of the method, a transfer function is determined from each value pair consisting of the layer thickness and the captured rise in temperature for the selection of electronic components. The rise in temperature on the outside of the coating above the resistance element in a measurement time interval of known length is captured for a selection of electronic components with known layer thicknesses for which the applied measurement voltage is known. The layer thickness of the coating above the resistance element may have been determined in each case using x-ray technology, for example. In this context, the rise in temperature may be determined on the basis of the temperature difference between the start temperature, that is to say the normal temperature when the voltage is applied, and the temperature which is reached at the end of the measurement time interval. In this way, a value pair consisting of the layer thickness and the temperature rise is known for each electronic component of the selection. From the various value pairs for the electronic components, it is possible to determine a transfer function, using an approximation function for example, from which transfer function it is possible to derive the layer thickness corresponding to a given rise in temperature. The approximation function may be a regression line, for example, that is to say a linear equation. The transfer function may be linear or also non-linear.

In a further development of the method, a transfer function for deriving the layer thicknesses from the captured rise in temperature is determined for each pyrometer used to inspect the layer thickness and/or each thermal imaging camera used to inspect the layer thickness. Thermal imaging cameras and/or pyrometers are used to determine the temperature of the outer coating of the electronic component. In order to enable a precise determination of the layer thickness that is to be derived from the respective captured temperature rise, formula-expressed correlations are calculated between the rise in temperature and the layer thickness for each thermal imaging camera and each pyrometer used in the serial measurement.

Figure 2:
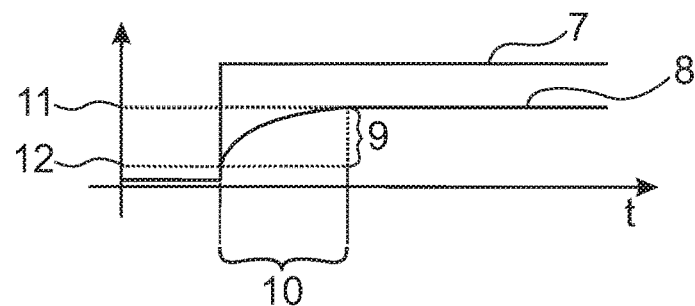
Figure 3:
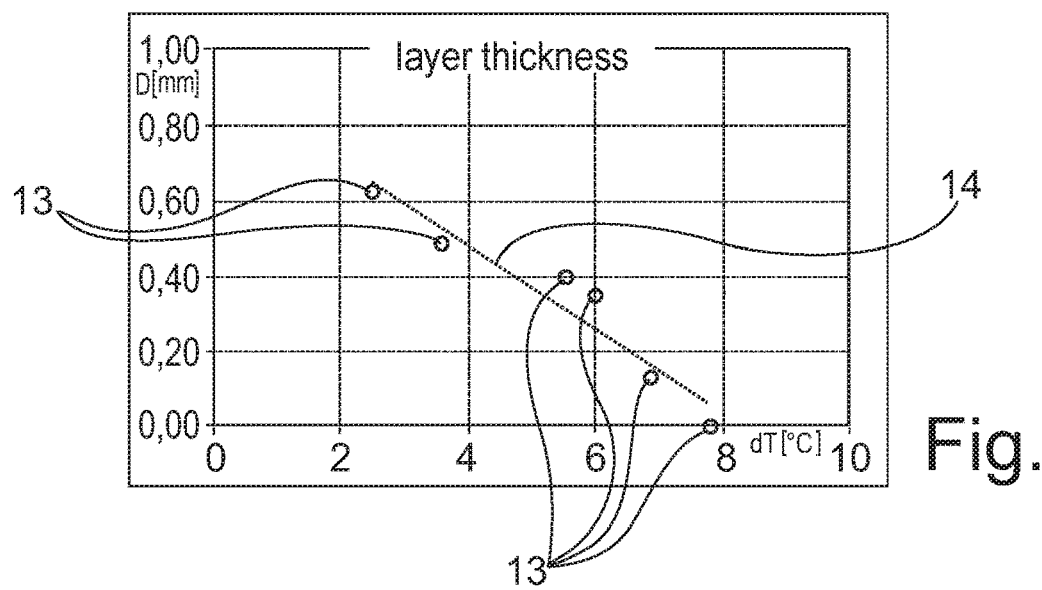
Figure 4:
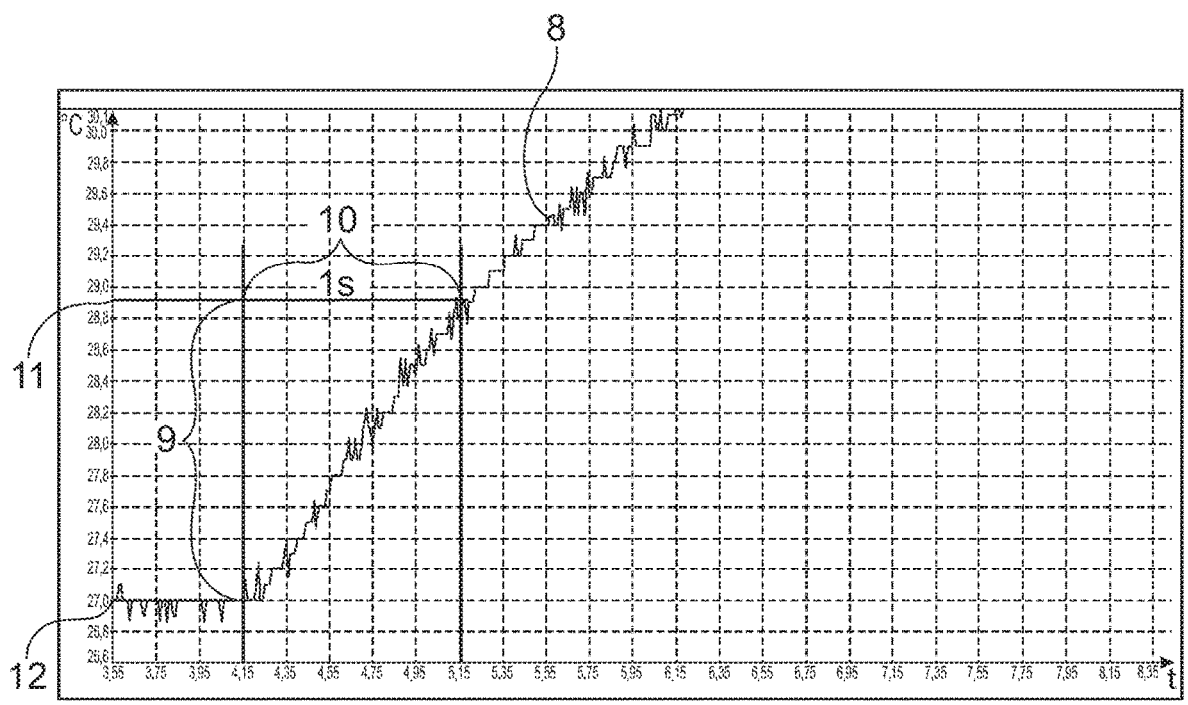
Figure 5:
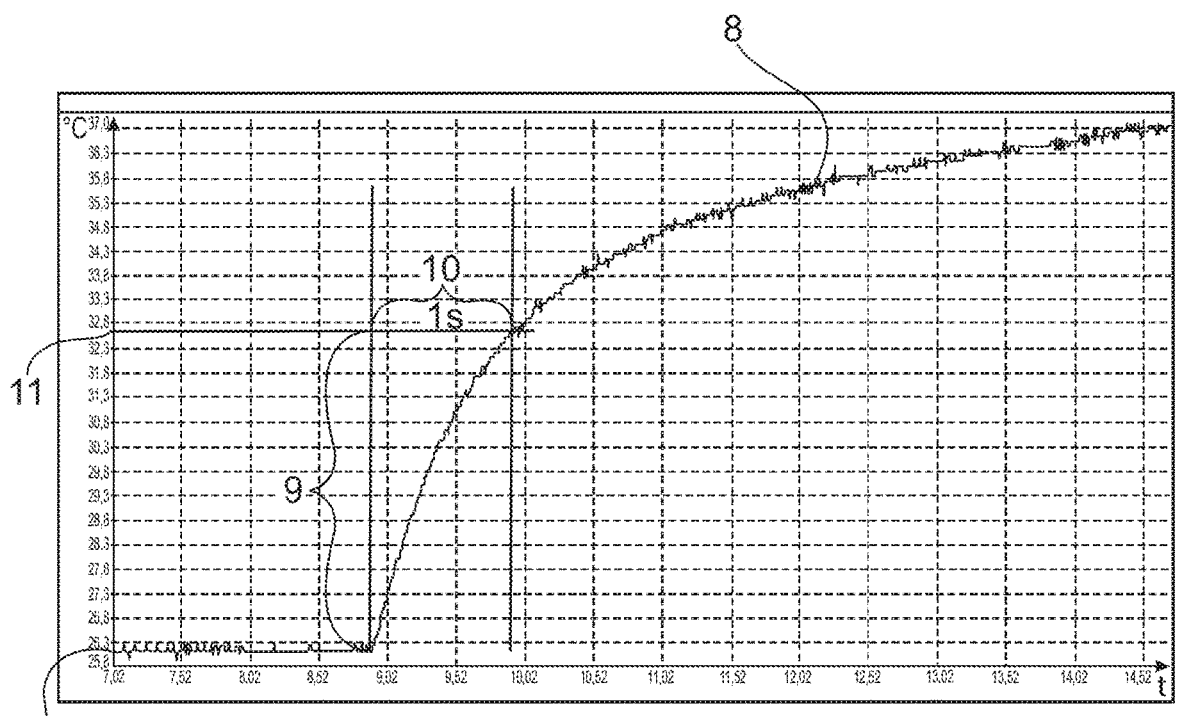

In the following section, the invention will be explained in greater detail with reference to an embodiment thereof which is illustrated in the drawing. The individual figures of the drawing each represent diagrammatically:

FIG. 1: a measuring assembly for determining the layer thickness with a temperature sensing device and an electronic component;

FIG. 2: the progression over time of the measurement voltage and the progression over time of the outside temperature of the coating;

FIG. 3: value pairs consisting of the layer thickness and temperature rise for a plurality of electronic components with regression line in a coordinate system;

FIG. 4: the rise in temperature in a properly functional electronic component; and FIG. 5: the rise in temperature in a defective electronic component.

FIG. 1 represents a measuring assembly for determining the layer thickness of a coating on an electronic component 1 with a temperature sensing device 2, for example a pyrometer or a thermal imaging camera. The electronic component 1 has contact regions 3 which may be contacted by contact fingers 4. The electronic component 1 includes a resistance element 5, and the layer thickness of a coating above the resistance element 5 is to be captured. For this purpose, an electrical voltage is applied to the resistance element 5 via the contact regions 3 and the contact fingers 4. The application of an electrical voltage causes the resistance element 5 to heat up, and the temperature variation on the surface of the coating above the resistance element 5 may be captured contactlessly by means of the temperature sensing device 2. In particular, the temperature sensing device 2 may be located at a distance of 100 mm from the electronic component 1. A conclusion may be drawn about the layer thickness of the coating above the resistance element 5 on the basis of the temporal progression of the temperature rise. The temporal progression may be output to a control device 6, for example a programmable logic controller.

FIG. 2 represents the idealised schematic temporal progression of the temperature 8 and the temporal progression of the measurement voltage 7. Applying an electrical measurement voltage 7 to the resistance element 5 gives rise to a temperature variation, which may be captured on the upper side of the coating deposited on the resistance element 5 by means of a temperature sensing device 2. The temperature progression 8 in this context is dependent on the layer thickness of the coating. The thinner the layer thickness of the coating above the resistance element 5 is, the greater is the rise in temperature 9 within a measurement time interval 10. The measurement time interval 10 has a defined length, for example one second. Within the measurement time interval 10, the rise in temperature 9, i.e. the difference between the end temperature 11 and the start temperature 12 is calculated. A conclusion about the layer thickness of the coating above the resistance element 5 is made on the basis of the rise in temperature 9 within the measurement time interval 10.

FIG. 3 shows measured value pairs 13 of the rise in temperature 9 and the layer thicknesses of six electronic components 1 of identical construction, determined for example using x-ray technology. The electronic components 1 in this context have different layer thicknesses of the coating above the resistance element 5 caused by the production process. A transfer function, particularly a regression line 14 may be calculated from the various measured value pairs 13. In this way it is possible to calculate the layer thickness using the transfer function of the regression lines 14 based on the captured rise in temperature 9 within a measurement time interval 10. The linear equation may have the form $y=mx+b$ for example. In this case, y would represent the layer thickness and x the rise in temperature, m and b describe the further factors that define the line.

FIG. 4 shows the temperature variation on the surface of a coating deposited over a resistance element 5, after a measurement voltage is applied to the resistance element 5, wherein the coating has adequate layer thickness. Within the measurement time interval 10, which in this case has a length of one second, the temperature on the outside of the coating rises by the rise in temperature 9, in this case by 1.9° C.

FIG. 5 shows the temperature variation on the surface of a coating deposited over a resistance element 5, after a measurement voltage is applied to the resistance element 5, wherein the coating does not have adequate layer thickness. Within the measurement time interval 10, which in this case has a length of one second, the temperature on the outside of the coating rises by the rise in temperature 9, in this case by 7.4° C.

All of the features described in the preceding description as well as those in the claims may be implemented in any combination with the features of the independent claim. The disclosure of the invention is thus not limited to the feature combinations that have been described and/or claimed, but rather all feature combinations that are practicable in the context of the invention are to be considered disclosed.

The invention claimed is:

1. A method for inspecting a protective coating of an electronic component, wherein an electrical resistance element is a part of the electronic component, wherein the electronic component comprises at least one electrical resistance element, wherein a layer thickness of at least one coating is determined thermographically, wherein the electrical resistance element is covered by the coating, and wherein the coating protects the electronic component and the electrical resistance element from external environmental influences, wherein the electrical resistance element has a different purpose in a later intended usage of the electronic component than in the process of coating inspection, wherein the electrical resistance element is contacted electrically, an electrical voltage is applied to the electrical resistance element, a temperature of the electronic component in an area of the electrical resistance element is captured as a function of time, and a conclusion is drawn about the layer thickness of the coating of the electronic component in the area of the electrical resistance element based on a temperature variation over time.

2. The method according to claim 1, wherein the temperature variation is captured by means of at least one pyrometer.

3. The method according to claim 1, wherein the temperature variation is captured by means of at least one thermal imaging camera.

4. The method according to claim 1, wherein the temperature variation over time is captured in a form of a rise in temperature within a defined measurement time interval, and the conclusion is drawn about the layer thickness of the coating on the basis of the rise in temperature.

5. The method according to claim 4, wherein the measurement time interval has a length of at least 0.5 second and not more than 5 seconds.

6. The method according to claim 4, wherein the measurement time interval has a length of 1 second.

7. The method according to claim 1, wherein the measurement time interval is started with an application of the electrical voltage to the electrical resistance element.

8. The method according to claim 1, wherein the electronic component is a sensor device and the electrical resistance element is a resistance thermometer.

9. The method according to claim 1, wherein the layer thickness is determined using a correlation between temperature variation and the layer thickness which is calculated in advance and stored in an evaluation unit.

10. The method according to claim 1, wherein a correlation between a rise in temperature within a measurement time interval and the layer thickness expressed as a formula is calculated using a selection of electronic components with known layer thicknesses.

11. The method according to claim 10, wherein the layer thicknesses of the selection of electronic components are determined using x-ray techniques.

12. The method according to claim 10, wherein a transfer function is determined from each derived value pair consisting of the layer thickness and the captured rise in temperature of the selection of electronic components.

13. The method according to claim 12, wherein the transfer function is calculated in order to determine the layer thicknesses from the captured rise in temperature for each pyrometer used for layer thickness inspection and/or each thermal imaging camera used for the layer thickness inspection.

14. A method for inspecting a protective coating of an electronic component, wherein an electrical resistance element is a part of the electronic component, wherein the electronic component comprises at least one electrical resistance element, wherein a layer thickness of at least one coating which covers the resistance element is determined thermographically, and wherein the coating is intended to protect the electronic component from external environmental influences, wherein the electrical resistance element has a different purpose in a later intended usage of the electronic component than in the process of coating inspection, wherein the electrical resistance element is contacted electrically, an electrical voltage is applied to the electrical resistance element, a temperature of the electronic component in an area of the electrical resistance element is captured as a function of time, a conclusion is drawn about the layer thickness of the coating of the electronic component in the area of the electrical resistance element based on a temperature variation over time, the electronic component is a sensor device and the resistance element is a resistance thermometer, wherein the electronic component has a plug connection with which the electronic component may be contacted during its actual subsequent use, and wherein the plug connection is used for the electrical contact of the electrical resistance element.

* * * * *